United States Patent
Bolin et al.

(10) Patent No.: US 6,307,172 B1
(45) Date of Patent: Oct. 23, 2001

(54) CIRCUIT BREAKER WITH PARTICLE TRAP

(75) Inventors: Philip Clarence Bolin, Sewickly; Harley Wayne Wilson, Murrysville; Dennis J. Matuszak, Cranberry Township, all of PA (US)

(73) Assignee: Mitsubishi Electric Power Products, Inc., Warrendale, PA (US)

( * ) Notice: Subject to any disclaimer, the term of this patent is extended or adjusted under 35 U.S.C. 154(b) by 0 days.

(21) Appl. No.: 09/482,996

(22) Filed: Jan. 13, 2000

(51) Int. Cl.$^7$ .............................. H01H 9/02; H01H 33/02
(52) U.S. Cl. .......................... 218/155; 174/16.2; 218/43; 218/68; 200/293
(58) Field of Search ................................ 174/14 R, 16.2, 174/28, 29; 218/1, 43, 51, 53, 68, 79, 155–158; 200/293

(56) References Cited

U.S. PATENT DOCUMENTS

| | | | |
|---|---|---|---|
| 3,553,410 | 1/1971 | Morva | 200/293 |
| 3,767,837 | 10/1973 | Graybill | 174/27 |
| 3,943,315 | 3/1976 | Taylor et al. | 218/79 |
| 3,996,414 | 12/1976 | Artbauer et al. | 174/28 |
| 4,020,306 | 4/1977 | Zahner et al. | 200/293 |
| 4,029,890 | * 6/1977 | Nakata | 174/14 R |
| 4,110,551 | 8/1978 | Cookson | 174/27 |
| 4,117,528 | * 9/1978 | Bolin | 218/68 X |
| 4,161,621 | 7/1979 | Bolin et al. | 174/14 R |
| 4,219,366 | 8/1980 | Dixon | 174/14 R |
| 4,256,254 | 3/1981 | Cookson et al. | 228/166 |
| 4,400,578 | 8/1983 | Cookson et al. | 174/14 R |
| 4,440,970 | 4/1984 | Dale | 174/14 R |
| 4,554,399 | 11/1985 | Cookson | 174/14 R |
| 4,730,085 | 3/1988 | Hama et al. | 174/14 R |
| 5,654,532 | 8/1997 | Meyer et al. | 218/63 |
| 5,798,484 | 8/1998 | Yamagiwa et al. | 174/14 R |

FOREIGN PATENT DOCUMENTS

| | | |
|---|---|---|
| 0 285 544 | 10/1988 | (EP) . |
| 2 412 970 | 7/1979 | (FR) . |
| 1 236 472 | 6/1971 | (GB) . |
| 60-38010 | 8/1983 | (JP) . |
| 05-091630 | 9/1991 | (JP) . |
| 10-201059 | 12/1996 | (JP) . |

OTHER PUBLICATIONS

A.H. Cookson, "Recent Research in the United States on the Effect of Particle Contamination Reducing the Breakdown Voltage in Compressed Gas–Insulated Systems", International Conference on Large High Voltage Electric Systems, Aug. 25–Sep. 2, 1976.

A.H. Cookson, "Effect of Conducting Particles on AC Corona and Breakdown in Compressed $SF_6$", Westinghouse Research Laboratories.

Philip C. Bolin, "Update on Field Experience with Compressed Gas–Insulated Transmission Systems", reprinted from vol. 41, Proceedings of the American Power Conference, 1979.

* cited by examiner

*Primary Examiner*—J. R. Scott
(74) *Attorney, Agent, or Firm*—Leydig, Voit & Mayer, Ltd.

(57) ABSTRACT

A circuit breaker is provided having a particle trap within an interior gas-insulation cavity containing a contact mechanism. The interior cavity is defined within a tank. In an embodiment, the tank has a generally cylindrical tank wall, and the trap is a recessed channel formed by the tank wall along a bottom of the interior cavity. The trap is effective to collect foreign particles present within the tank, thereby reducing breakdown. In an embodiment, portions of the tank wall adjacent to the channel curve or slope downwardly toward the channel to guide particles moving under the influence of gravity, mechanical vibration and gas flow into the trap where they are immobilized in operation due to the low electrical field.'

9 Claims, 6 Drawing Sheets

CIRCUIT BREAKER WITH PARTICLE TRAP

BACKGROUND OF THE INVENTION

The present invention relates generally to the art of high-voltage circuit breakers and particularly to circuit breakers with gas-insulated tanks enclosing separable contacts.

Gas-insulated circuit breakers are known. Such circuit breakers generally include separable contact elements contained within a sealed tank filled with an inert insulating gas for reducing arcing. Specifically, the gas is typically sulfurhexaflouride ($SF_6$) due to its good insulative and arc interruption properties.

Despite careful manufacturing practices, an assembled circuit breaker tank can contain undesirable foreign particles, such as dust, metal shavings from machined parts, etc. Although unlikely, it is also possible that hardware, e.g., nuts, washers, screws, etc., could work loose during operation. It is undesirable for such particles, particularly metallic conductive or semiconductive particles, to freely reside within the tank. Such particles, if permitted to remain free, can interfere with the operation of the circuit breaker, causing undue arcing, flashing or promoting breakdown between metallic components. The presence of particles greatly reduces the breakdown voltage of the circuit breaker. Sensitivity to particles increases with the voltage across the circuit breaker due to the increased electric field stress levels. Circuit breakers are now constructed capable of handling very high voltages, for example 362 kV and higher.

In a conventional tank, the operation of the contacts can cause such particles to move about. For example, it is known that the operation of opening and closing the contacts causes shocks and vibrations capable of moving loose particles within the tank. Also, in a "puffer" type circuit breaker, the operation of opening the contacts results in flows of $SF_6$ gas capable of blowing loose particles around the tank.

Traps for foreign particles are known in the art of high-voltage gas insulated transmission lines, but it has been previously believed for several reasons that a particle trap in a tank section of a high voltage circuit breaker would be ineffective. A primary reason is that circuit breakers are not field tested with a "conditioning" AC voltage as are gas insulated lines. The use of particle traps in transmission lines requires that an AC test voltage be gradually raised from low levels to a level higher than the operating voltage. This moves particles into receptacles provided in the gas chamber designed to trap the particles before the particles can cause a breakdown. Furthermore, the severe mechanical shock that occurs in a circuit breaker and the blasts of $SF_6$ gas in "puffer" contacts could force undesirable movement of particles.

Efforts have been made to include a particle filter or trap in gas insulated systems which include circuit breakers, however these systems utilize means remote from the circuit breaker tank, such as within the aforementioned gas insulated transmission lines, to attempt to capture particles present in gas flows through the system. U.S. Pat. No. 4,219,366 discloses a gas-insulated system including circuit breakers wherein gas insulated transmission lines connected to the circuit breakers include a sticky coating. U.S. Pat. No. 3,943,315 discloses a particle filter located in a circuit of $SF_6$ flow pipes supplying $SF_6$ gas to a circuit breaker tank from an external $SF_6$ gas source and compressor.

It is desirable to immobilize foreign particles within a tank of a high-voltage circuit breaker in order to assure effective circuit breaker operation and to minimize potential damage.

SUMMARY OF THE INVENTION

The present invention provides a circuit breaker including a contact mechanism movable between an open and closed position, a driving mechanism operable to drive the contact mechanism between the open and closed positions, and a tank having at least one wall defining an interior chamber enclosing the contact mechanism, the interior chamber being filled with a gas, such as $SF_6$. The wall defines a trap in a bottom of the tank for collecting foreign particles.

In an embodiment, the trap is shaped as an elongated, recessed channel located on the bottom of the tank. In an embodiment wherein the circuit breaker tank is generally cylindrical in shape, the channel is axially directed relative to a longitudinal axis of the tank. The channel preferably extends substantially along a length of the cavity within the tank which encloses the contact mechanism. The channel can have various shapes, including, but not limited to, a flat bottom shape, U-shape, or V-shape.

According to an embodiment, a portion of the wall of the tank adjacent to the channel forms a lip that slopes downwardly toward the channel along one or both sides of the channel.

In an embodiment, adhesive material is disposed in the channel for immobilizing particles that enter the trap.

An advantage of the present invention is to provide a trap for a high-voltage circuit breaker which traps foreign particles within a tank of the circuit breaker without relying only on electric field induced movement of the particles into trap. The invention uses the mechanical shock, vibration and gas flow from the operation of the breaker during initial testing to move any loose particles to the particle trap. The particles are immobilized during operation due to the low electrical field in the bottom of the particle trap.

Another advantage of the present invention is to provide a particle trap in a high-voltage circuit breaker which is easy to clean.

A further advantage of the present invention is to provide a particle trap in a high-voltage circuit breaker which is simple and inexpensive to manufacture.

Additional features and advantages of the present invention are described in, and will be apparent from, the detailed description of the preferred embodiments, the Figures and the claims.

DETAILED DESCRIPTION OF THE PRESENTLY PREFERRED EMBODIMENTS

Figure 1:
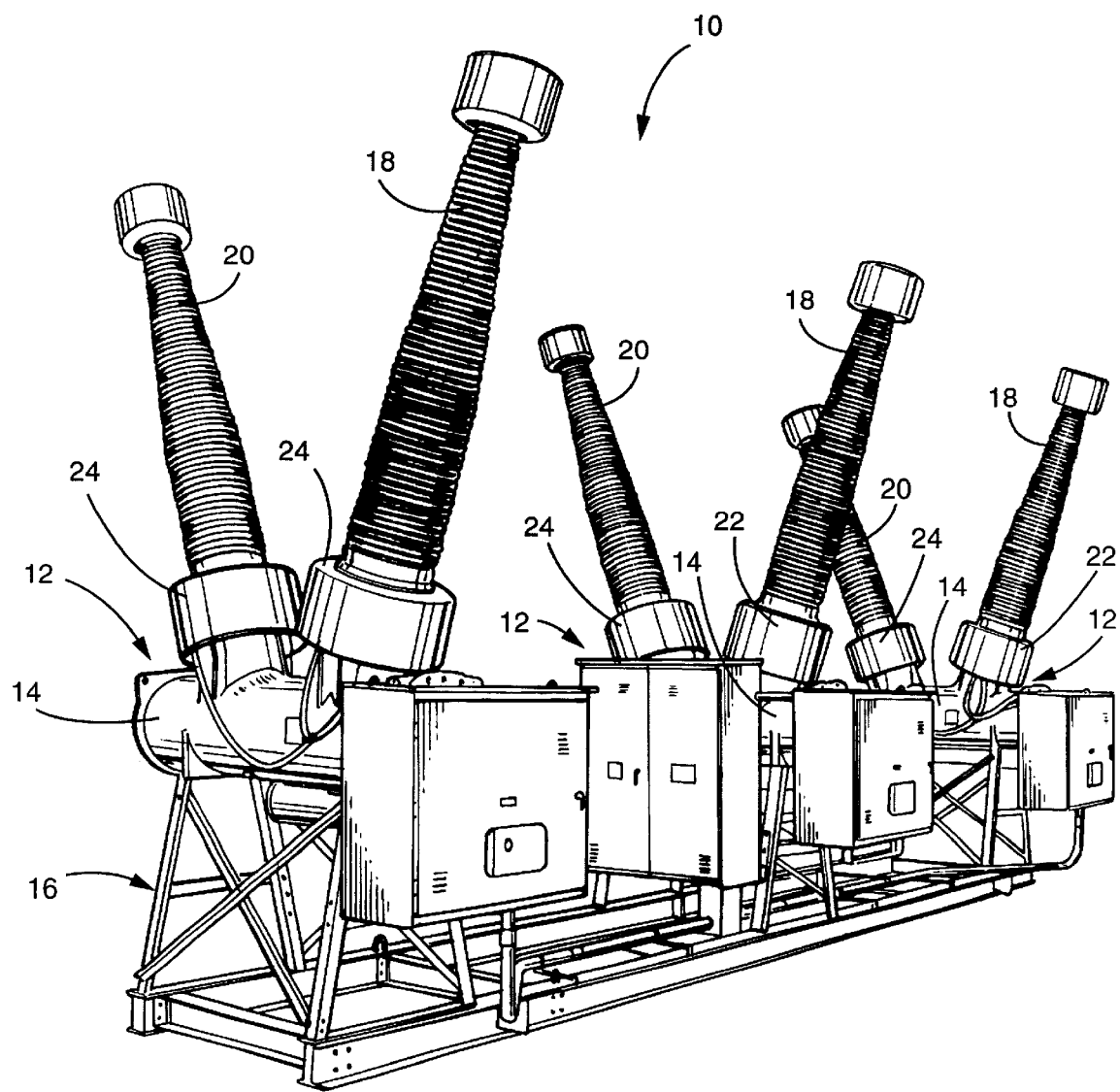
FIG. 1 is a perspective view of a high-voltage circuit breaker station having three separate poles constructed in accordance with teachings of the present invention.

Now referring to the drawings, wherein like numerals designate like components, FIG. 1 illustrates a three-pole circuit breaker 10 constructed in accordance with teachings of the invention. The circuit breaker 10 includes three horizontal circuit breakers 12, each having an exterior tank 14 mounted to a frame 16 supported on the ground. Preferably, the tanks 14 are grounded to the frame 16, so that the circuit breaker 10 is a "dead tank" type circuit breaker. As illustrated in FIG. 1, and also in sectional views 2 and 3, each of the circuit breakers 12 includes an entrance insulator 18 and a corresponding exit insulator 20 extending outwardly from opposite sides of the respective tanks 14, with current transformers 22 and 24 respectively mounted to each of the entrance and exit insulators 18 and 20 near the tank 14. Each of the circuit breakers 12 has, contained within a cabinet 26 (FIG. 1), an operating mechanism and controller as are generally well-known for driving contact components within the tank 14, described in greater detail below in connection with FIGS. 2 and 3, for selectively opening and closing a circuit between the respective entrance and exit insulators 18, 20.

Figure 2:
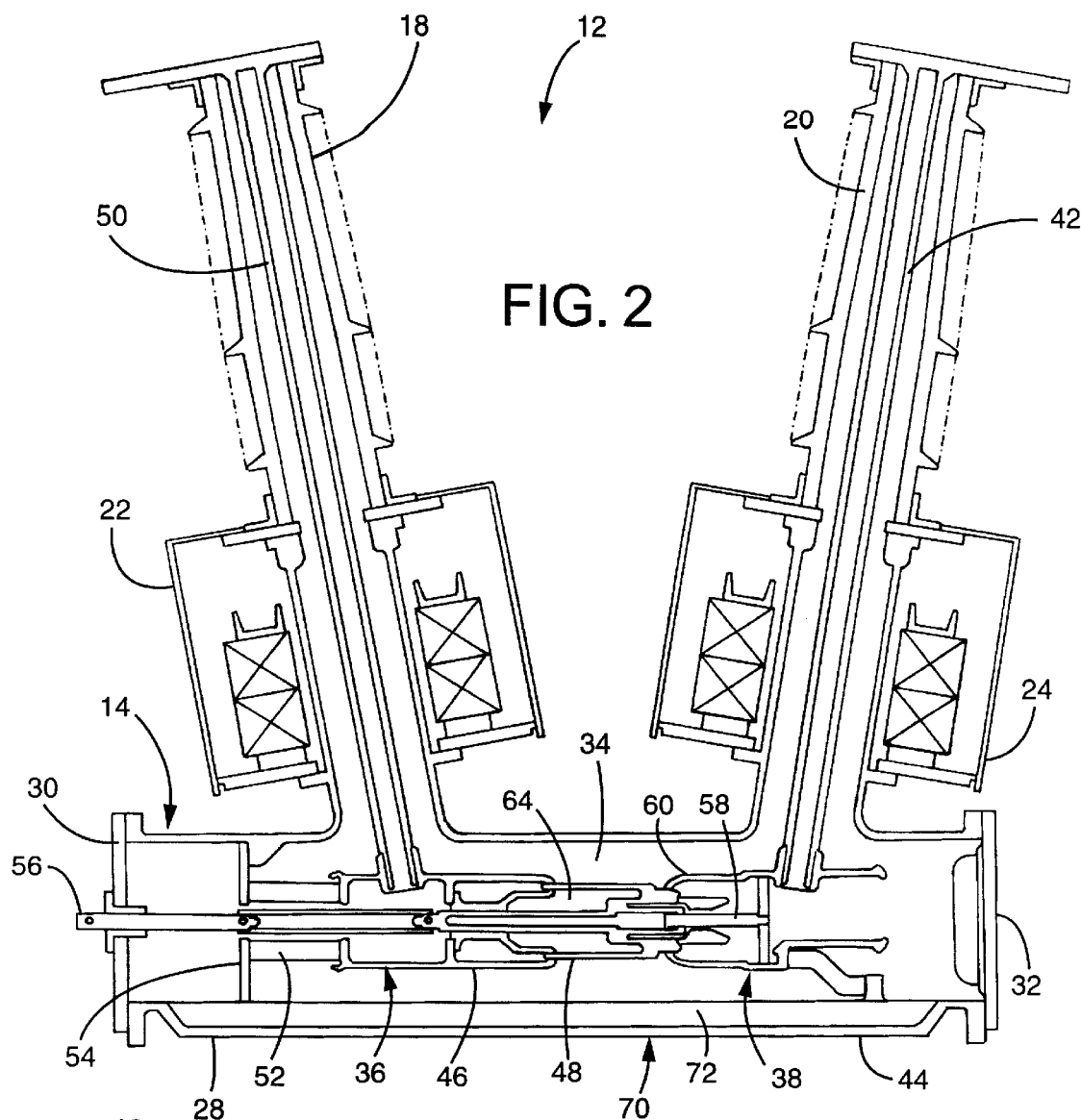
FIG. 2 is a schematic sectional side view of a circuit breaker from the circuit breaker station of FIG. 1, as shown in a closed condition.

Turning to FIG. 2, the circuit breaker 12 is shown in greater detail. The tank 14 has a generally cylindrical wall 28 and a pair of end plates 30, 32, defining an interior cavity 34. Contained within the cavity 34, the circuit breaker 12 has a movable contact assembly 36 and a stationary contact assembly 38 in an exemplary contact configuration generally known as a single-break puffer system, although the trap of the invention could also be implemented with other styles of circuit breakers. For insulating the contact assemblies 36 and 38, interior cavity 34 and insulators 18, 20, are filled with a dielectric gas, such as $SF_6$ or some other appropriate gas. Although circuit breakers are known wherein the $SF_6$ gas is maintained at ambient pressure, the $SF_6$ gas is usually pressurized to approximately 70 psig or higher.

The movable and stationary contact assemblies 36, 38 are positioned generally centrally within the interior cavity 34 of the tank 14, spaced apart from the tank wall 28. More specifically, the stationary contact assembly 38 is conductively mounted to an exit conductor 42 disposed within the exit insulator 20 and also secured to a lower insulative support member 44 extending from the tank wall 28. The movable contact assembly 36 has a fixed portion 46 and a movable portion 48 which are cooperatively configured for relative slidable movement. The fixed portion 46 of the movable contact assembly 36 is held secure relative to the tank 14, the fixed portion 46 being conductively mounted to an entrance conductor 50 disposed within the entrance insulator 18 and to an insulator tube 52 having an outwardly-extending flange 54 which is secured to the tank wall 28. A linearly movable operating rod 56 extends though the insulator tube 52, which drives movable portion 48 of movable contact assembly 36 selectively between open and closed positions in a generally well-known manner. Various known mechanisms may be used for driving the operating rod 56, including pneumatic and hydraulic systems, cam-spring systems, etc.

Figure 3:
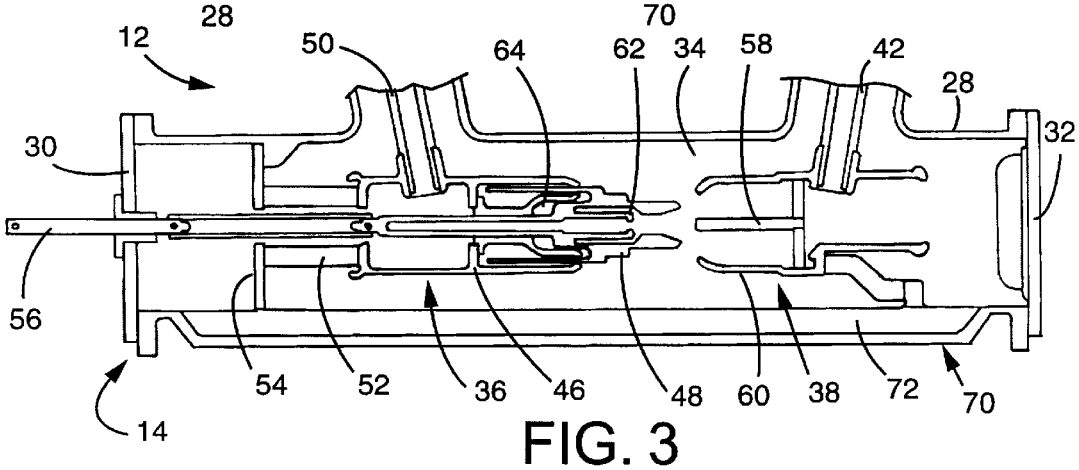
FIG. 3 is a schematic sectional side view of the circuit breaker of FIG. 2 illustrated in an open condition.

To close the circuit breaker 12 and to establish a connection to conduct electric current between the entrance and exit conductors 42 and 50, the movable and stationary contact assemblies 36, 38 can be conductively engaged in a closed condition, as illustrated in FIG. 2. FIG. 3 illustrates the circuit breaker 12 in an open condition, wherein the movable and stationary contact assemblies 36 and 38 are separated.

The stationary contact assembly 38 includes a central, rod-shaped, male contact member 58 and a peripheral contact member 60. The movable contact portion 48 has a female contact member 62 which, in the closed condition shown in FIG. 2, receives male contact member 58 and which fits within peripheral contact member 60 of stationary contact assembly 38. The movable portion 48 of the movable contact assembly 36 is retractable away from the stationary contact assembly 38 in an open condition to interrupt the circuit between the entrance and exit conductors 42 and 50.

For reducing arcing when interrupting the circuit, the movable and stationary contact assemblies 36, 38 are cooperatively designed to provide a "puff" of $SF_6$ gas over separating contact surfaces while disconnecting. Generally, the movable portion 48 of the movable contact assembly retracts into a puffer chamber 64 formed between the fixed and movable portions 46, 48 of the movable contact assembly 36. This causes the volume of the puffer chamber 64 to decrease in size, as shown in FIG. 3, thereby increasing pressure of the $SF_6$ gas in the chamber 64. The puffer chamber 64 is in fluid communication with an interior of the female contact member, so that upon separation of the female contact member 62 and male contact member 58, the pressurized $SF_6$ gas escapes in a blast or "puff" over the separating surfaces, providing enhanced cooling and arc reduction.

In order to collect particles within the tank 14, the circuit breaker 12 includes a particle trap 70, as illustrated in FIGS. 2–5. According to an embodiment of the invention, the wall 28 of the tank 14 defines a channel 72 disposed at a bottom of the tank 14. Preferably, the channel 72 is elongated in shape and extends longitudinally along an axial direction of the tank 14. In an embodiment, the channel 72 extends substantially along the length of the tank 14, as illustrated in FIGS. 2 and 3.

Figure 4:
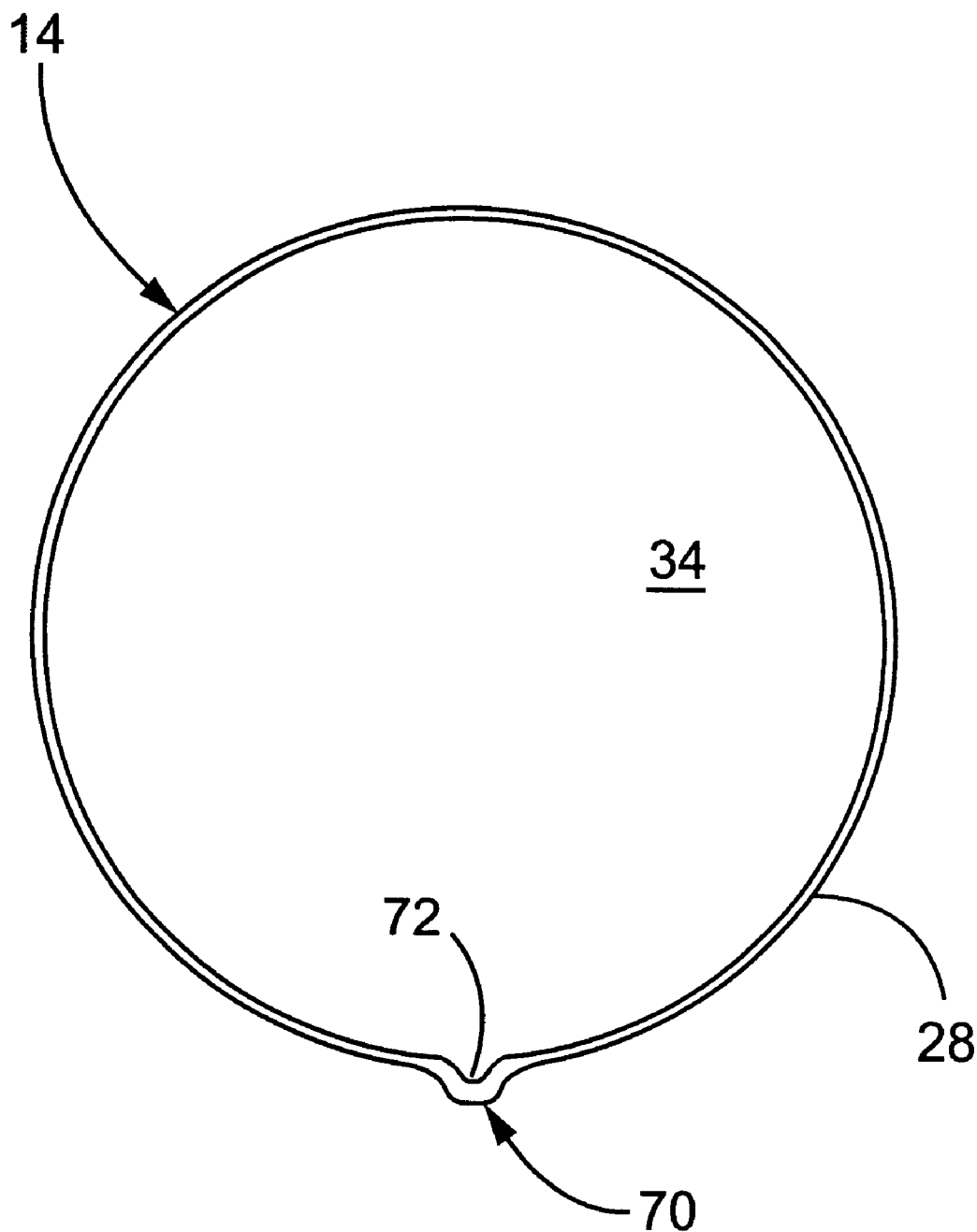
FIG. 4 is a sectional end view of a tank of the circuit breaker as taken generally along line IV—IV of FIG. 2.
Figure 5:
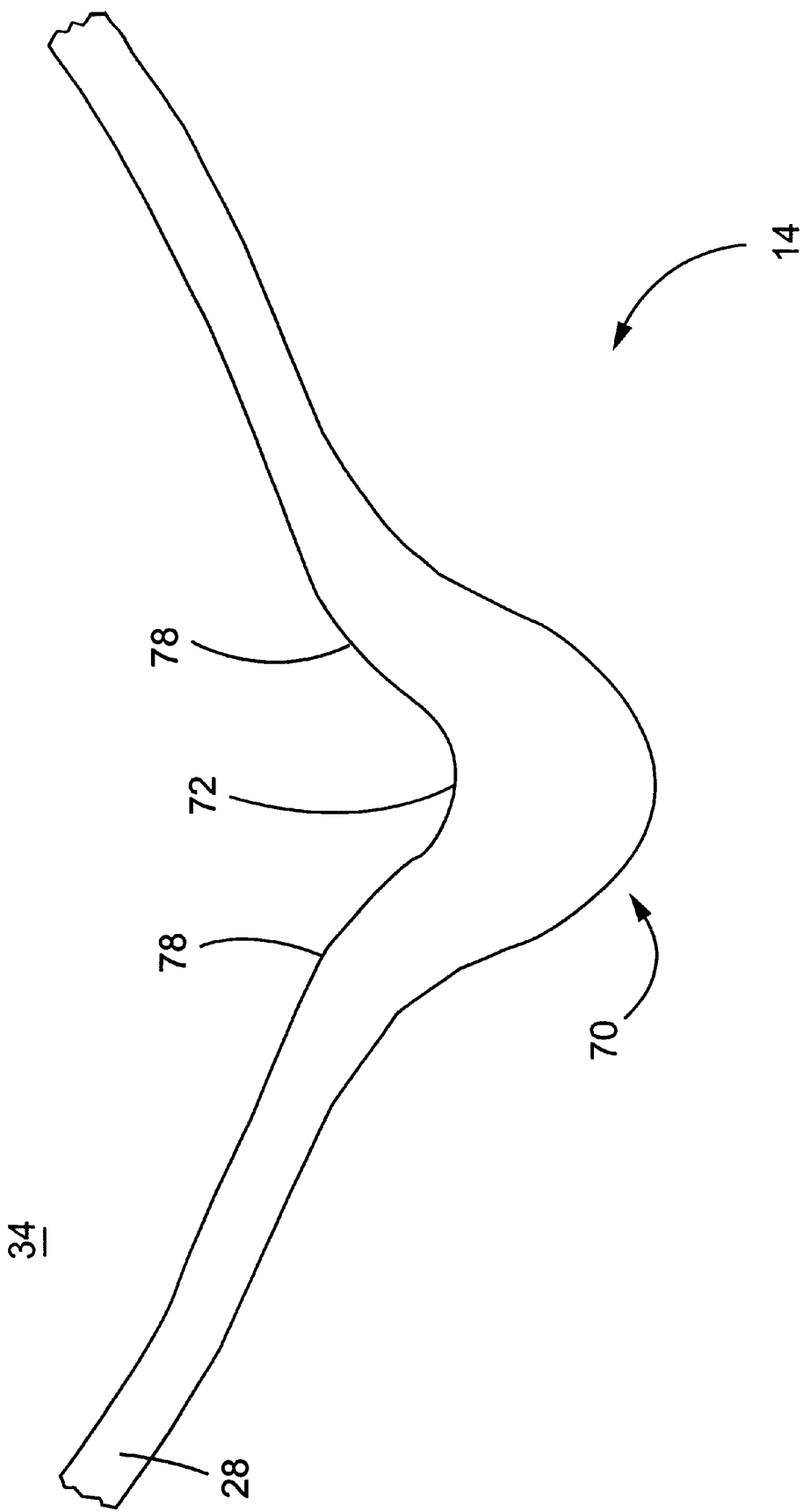
FIG. 5 is an enlarged fragmentary sectional view of the tank in the vicinity of the trap illustrated in FIG. 4.

As illustrated in FIGS. 4 and 5, the channel 72 is generally U-shaped, having a rounded bottom, The tank wall 28 is contoured with portions 78 which curve convexly relative to the interior of the tank 14, the portions 78 forming sides of the channel 72. The downwardly curved portions 78 help collect particles under the influence of gravity in the trap 70. The bottom of the channel 72 is curved concavely relative to the interior 34 of the tank 14. Additionally, the tank wall 28 gradually increases in thickness to a maximum thickness below the channel 72.

In an embodiment wherein the radius of the tank 14 as measured from a centerline axis to an interior surface of the wall 28 is generally about 298 mm, a suitable channel 72 has a bottom that is about 331 mm measured from the centerline. Of course, the dimensions of the tank 14 and channel 72 may vary. In terms of dimensional proportion, it is believed suitable to provide a channel 72 having a bottom that measures about 10% farther from the tank centerline than the general radius of the tank wall 28. In other words, the depth of the channel is preferably about 10% of the general radius of the tank 14.

Figure 7:
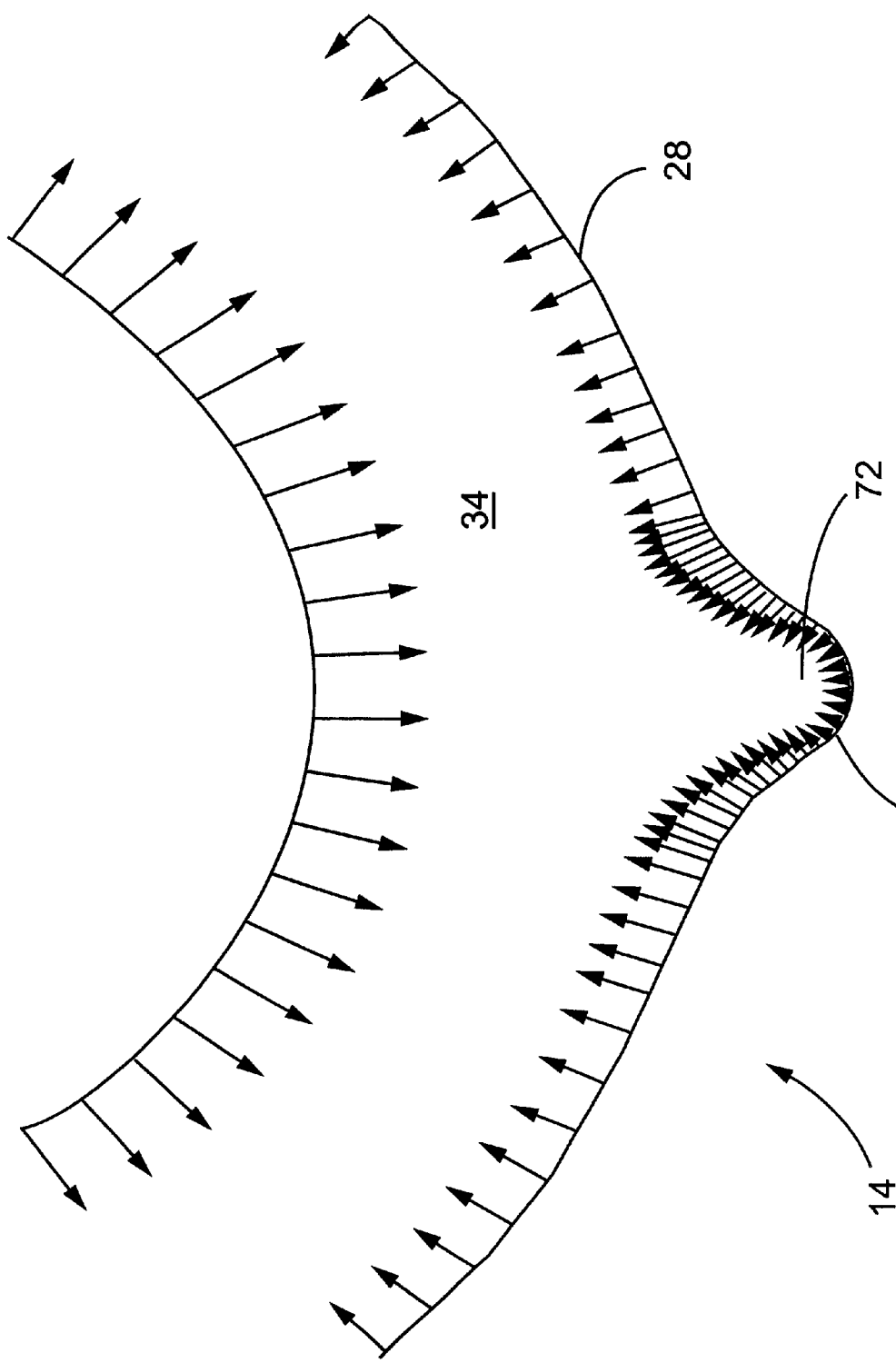
FIG. 7 is a schematic sectional end view of a tank of the circuit breaker as taken generally along line IV—IV of FIG. 2 showing electric field vectors generally indicating the strength of the electrical field on the surfaces of the circuit breaker parts and the tank interior.

In service, most particles fall into the trap 70 under the influence of gravity, assisted by an initial shock and gas flow from trial operations of the circuit breaker 10 before it is placed into service. It has been found that the electrical field in the bottom of the trap 70 is significantly lower than at other locations of the grounded tank wall 28, as illustrated by the schematic electric field vector diagram in FIG. 7. Therefore, particles collected in the trap 70 remain there instead of being attracted toward other portions of the interior cavity of the tank 14 where electric fields are stronger. Additionally, the channel 72 is distant enough from the contact assemblies 36 and 38 (FIGS. 2 and 3) that the particles are not typically blown out of the trap 70 by puffs of $SF_6$ gas.

An advantage of the trap 70 of the invention is that it is easily cleaned. When the tank 14 is opened for maintenance, particles collected in the channel 72 can be easily swept out.

The channel may be other shapes as well, according to various embodiments of the invention. For example, in an embodiment as illustrated FIG. 6, a flat-bottomed trap 170 is shown. The trap 170 includes a channel 172 defined by a tank wall 128, wherein the channel 72 has a generally horizontal bottom surface 74 and a pair of opposed longitudinal side surfaces 76.

Figure 6:
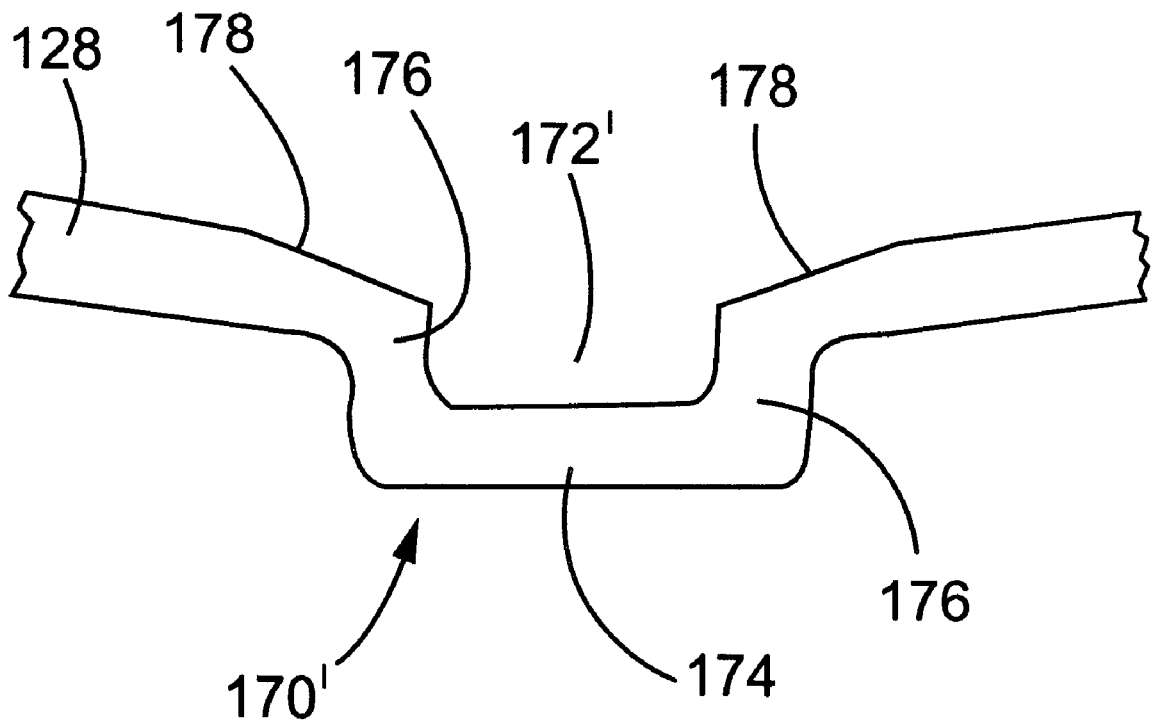
FIG. 6 is a fragmentary sectional view of a tank having a trap having an alternative shape.

The channel 172 has a width between the side surfaces 176 sufficient to trap particles without a need for AC voltage "conditioning." For example, in an embodiment wherein a radius of the tank is about 35 cm, it has been found that a suitable width for the channel 172 as illustrated in FIG. 6 is about 50–100 mm wide and about 25 mm deep or greater. Channels having a width in a range of about 25–200 mm are presently believed to provide suitable performance. To assist particle collection, the tank wall 128 includes one or more lips or sloped portions 178 adjacently located along a side of the channel 172. The sloped portions 178 slope downwardly toward the channel 172 so that particles are drawn by gravity into the channel 172.

While the invention has been described in connection with certain preferred embodiments, there is no intent to limit it to those embodiments. On the contrary, it is recognized that various changes and modifications to the exemplary embodiments described herein will be apparent to those skilled in the art, and that such changes and modifications may be made without departing from the spirit and scope of the present invention. Therefore, the intent is to cover all alternatives, modifications, and equivalents included within the spirit and scope of the invention as defined by the appended claims.

What is claimed is:

1. A circuit breaker comprising:
   a contact mechanism movable between an open and closed position;
   a driving mechanism operable to drive the contact mechanism between the open and closed positions;
   a tank having at least one wall defining an interior chamber enclosing the contact mechanism, the interior chamber being filled with a gas; and
   a trap in a bottom of the tank for collecting foreign particles, wherein the trap is a channel defined by the wall of the tank, the channel opening to the interior chamber and extending substantially along a length of the interior chamber; the channel having a generally U-shaped bottom, along opposite longitudinal sides of the channel the wall being shaped to curve downwardly into the channel in a manner convex in shape with respect to the interior cavity.

2. The circuit breaker according to claim 1, wherein the channel has a width of about 25–200 mm.

3. The circuit breaker according to claim 1, wherein the channel has a depth of about 25 mm or greater.

4. The circuit breaker according to claim 1, wherein the tank is generally cylindrical in shape, the channel being axially directed.

5. The circuit breaker according to claim 4, wherein the cylindrical tank has a centerline, wherein the tank generally has a radius between the centerline and the tank wall and wherein a dimension from the centerline to a bottom of the channel is about 10% greater than said radius.

6. The circuit breaker according to claim 5, wherein the trap is a recessed channel formed by the tank wall.

7. A circuit breaker comprising:
   a contact mechanism operable to selectively open or close a circuit;
   a tank wall defining an interior cavity for enclosing the contact mechanism, the contact mechanism being spaced from the tank wall; and
   a particle trap defined in the tank wall at a bottom of the interior cavity; wherein the trap is a recessed, generally U-shaped channel formed by the tank wall, the channel extending substantially along a length of the interior cavity along opposite longitudinal sides of the channel the wall being shaped to curve downwardly into the channel.

8. The circuit breaker according to claim 7, wherein the channel has a width of about 25–200 mm.

9. The circuit breaker according to claim 7, wherein the channel has a depth of about 25 mm or greater.

* * * * *